United States Patent
Chase et al.

(10) Patent No.: US 8,371,124 B2
(45) Date of Patent: Feb. 12, 2013

(54) JET NOZZLE PLUG WITH VARYING, NON-CIRCULAR CROSS SECTIONS

(75) Inventors: James D. Chase, Reno, NV (US); German Andres Garzon, Reno, NV (US)

(73) Assignee: Aerion Corporation, Reno, CA (US)

( * ) Notice: Subject to any disclaimer, the term of this patent is extended or adjusted under 35 U.S.C. 154(b) by 892 days.

(21) Appl. No.: 12/384,248

(22) Filed: Apr. 3, 2009

(65) Prior Publication Data

US 2010/0139284 A1 Jun. 10, 2010

Related U.S. Application Data

(60) Provisional application No. 61/124,118, filed on Apr. 15, 2008.

(51) Int. Cl.
F02K 1/00 (2006.01)
B63H 11/10 (2006.01)

(52) U.S. Cl. .................................. 60/770; 239/265.19

(58) Field of Classification Search ................ 60/770, 60/771, 226.1, 230; 239/265.11, 265.13, 239/265.15, 265.17, 265.19, 265.23, 265.25, 239/265.27, 265.29, 265.31, 265.33, 265.35, 239/265.37, 265.39, 265.41, 265.43

See application file for complete search history.

(56) References Cited

U.S. PATENT DOCUMENTS

| | | | | |
|---|---|---|---|---|
| 4,066,214 A | * | 1/1978 | Johnson | 239/265.19 |
| 4,398,667 A | * | 8/1983 | Maestrello | 239/265.17 |
| 5,082,181 A | * | 1/1992 | Brees et al. | 239/265.35 |
| 5,150,571 A | | 9/1992 | Herzog | |
| 5,167,118 A | * | 12/1992 | Torkelson | 60/226.1 |
| 5,402,963 A | * | 4/1995 | Carey et al. | 244/1 N |
| 5,579,999 A | * | 12/1996 | Seiner et al. | 239/265.11 |
| 5,699,966 A | * | 12/1997 | Beverage | 239/265.19 |
| 5,826,794 A | * | 10/1998 | Rudolph | 239/265.17 |
| 5,924,632 A | | 7/1999 | Seiner et al. | |
| 6,935,098 B2 | | 8/2005 | Bardagi et al. | |
| 7,246,481 B2 | | 7/2007 | Gutmark et al. | |
| 2004/0008572 A1 | | 1/2004 | Stuart | |

* cited by examiner

*Primary Examiner* — Ehud Gartenberg
*Assistant Examiner* — Gerald Sung
(74) *Attorney, Agent, or Firm* — William W. Haefliger

(57) ABSTRACT

In a jet engine having a plug nozzle and a plug extending rearwardly from the nozzle exit, the improvement comprising a plug having successive cross sections spaced apart rearwardly of the nozzle exit, the cross sections transitioning from circular or near circular at the exit plane defined at the nozzle exit, to progressively non-circular, rearwardly.

8 Claims, 5 Drawing Sheets

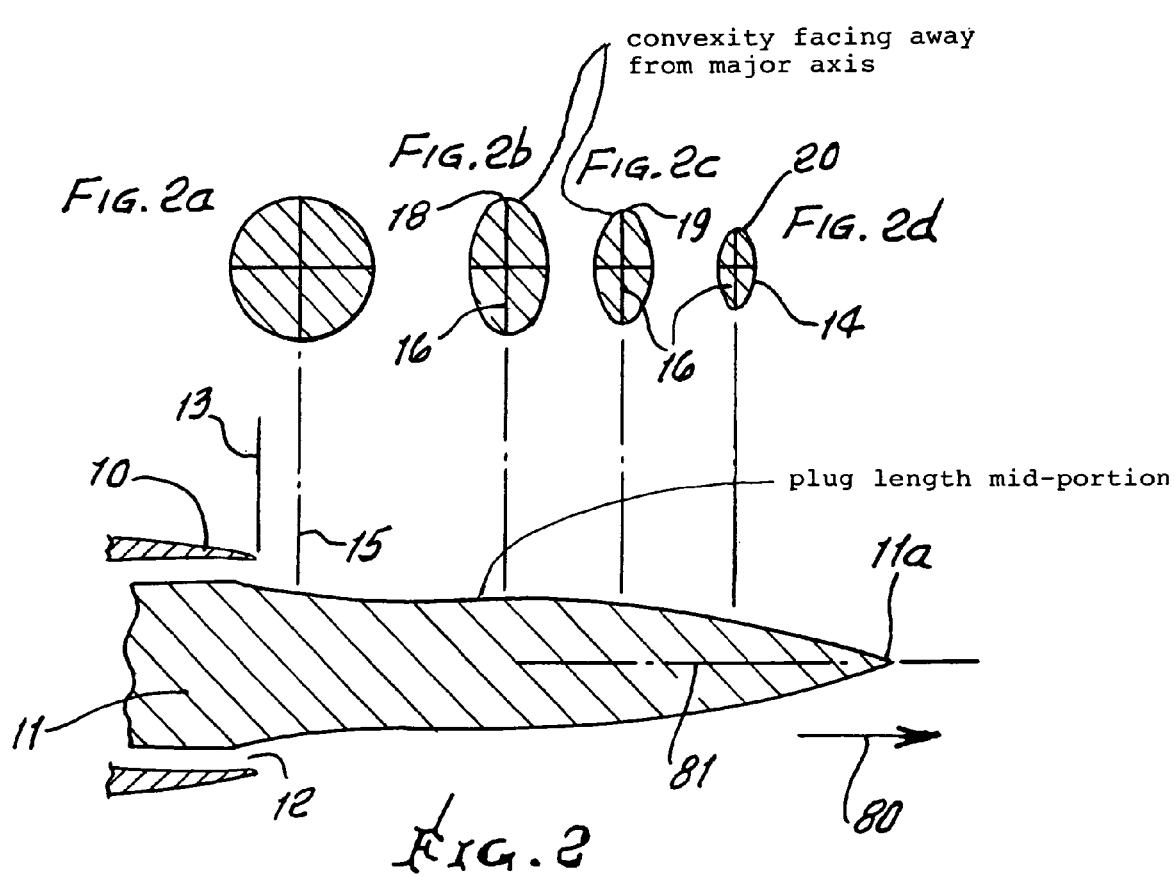

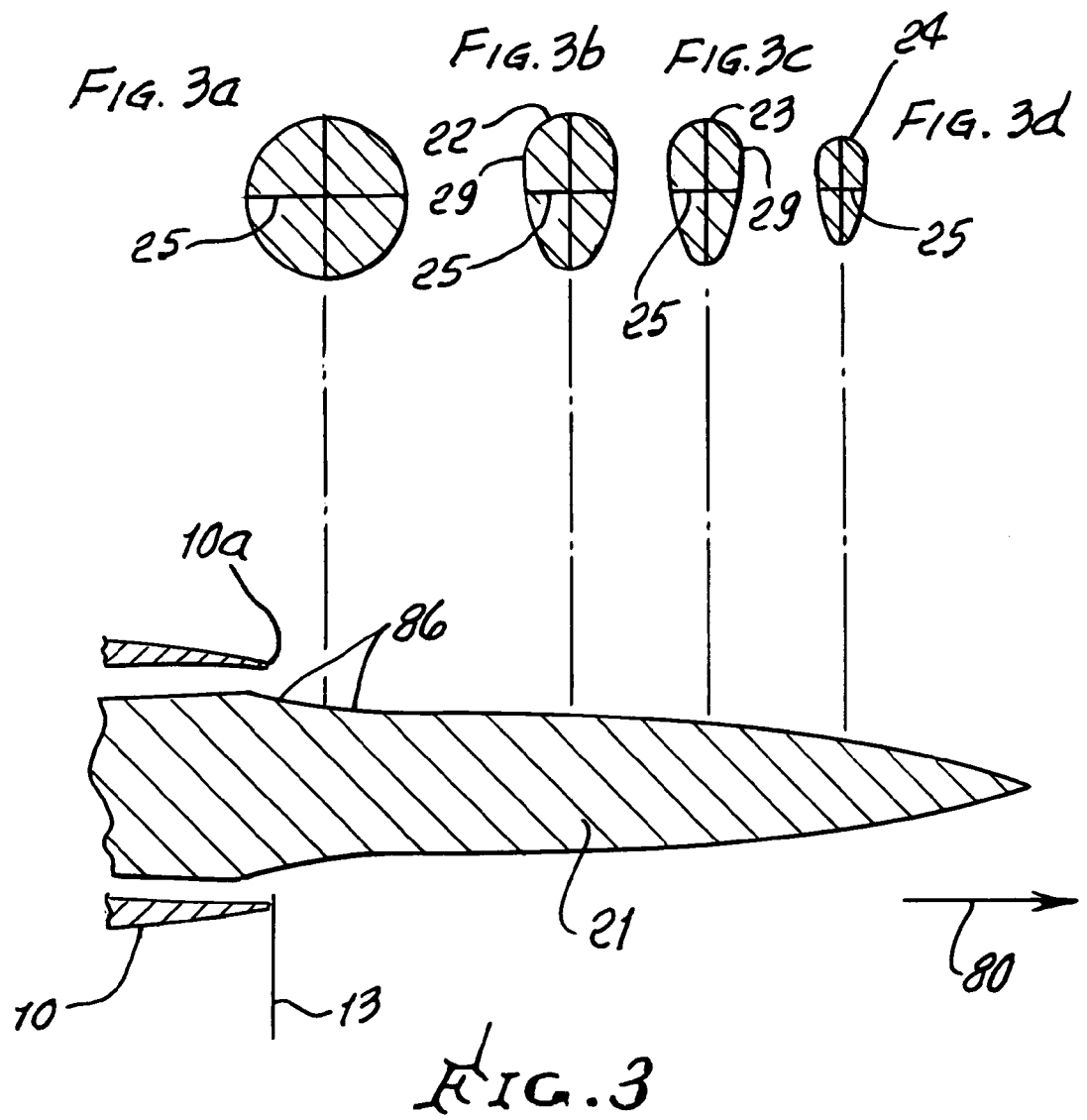

JET NOZZLE PLUG WITH VARYING, NON-CIRCULAR CROSS SECTIONS

This application claims priority over provisional application Ser. No. 61/124,118, filed Apr. 15, 2008.

BACKGROUND OF THE INVENTION

A need exists for aircraft engine propulsion nozzles with reduced acoustic noise signatures for low speed operations around airports and the surrounding community. Recently more stringent FAR36 Stage 4 regulations for community noise standard were enabled which further restrict allowable noise emissions from aircraft. The major source of noise from aircraft is the high speed jet emanating from the exhaust nozzles of turbofan engines. Past experimental work established the potential for high radius plug nozzles to reduce jet noise with relatively modest reductions in thrust efficiency. See "Initial Results of a Porous Plug Nozzle for Supersonic Jet Noise Suppression", by Maestrello, NASA TM-78802, 1978, and "Jet Noise Suppression by Porous Plug Nozzles" by Bauer, Kibens, and Wlezian, NASA Contractor report 3613, 1982.

A high radius plug nozzle consists typically of a circular annulus outer ring 10 on the nacelle exit surrounding a concentric circular inner "plug" shape 11 of smaller diameter, as illustrated in FIG. 1. The exhaust flows out the gap 12 between inner and outer surfaces, with the inner plug lengthwise extending surface generally being several plug diameters in length.

"High radius" refers to a relatively high ratio of the radius of the inner plug relative to the outer cowl radius at the exit plane 13. A high radius plug features a relatively large plug and thin exit annular opening. One of the phenomena leading to reduced noise relative to a simple circular nozzle is the greater shear area relative to the thickness of the annular jet, leading to shorter mixing length between the high speed jet and the relatively lower speed external flow (due aircraft flight speed) passing around the outside of the nozzle and joining at the exit plane. Much of the acoustic work on plug nozzles has focused on "porous" plugs which feature a hollow plug drilled with arrays of small holes, this to suppress "screech" tones associated with shock cells of high pressure ratio supersonic aircraft nozzles. Test results, have also showed significant noise reductions with solid plugs at the lower pressure ratios associated with subsonic aircraft.

Some recent work on jet acoustics has focused on inducing non-circular shaping of the exhaust plumes of simple (non-plug) nozzles, such as by two-dimensional (2-D) rectangular or elliptical cross-sections, or by cutting the nozzle along an angled plane not normal to the direction of flow—a "bevel nozzle". It has been shown that under favorable circumstances elongating the cross-section of the plume behind these designs can produce a directivity pattern to the noise emissions, typically being reduced in the direction of the elongation of the plume.

SUMMARY OF THE INVENTION

The herein described invention concerns shaping the plug into varying non circular cross-sections behind the exit plane of a plug nozzle so as to induce an elongated plume cross-section shape, and thereby reducing acoustic emissions in certain favorable directions.

Basically, improvement is made to a jet engine having a plug nozzle and a plug extending rearwardly from the nozzle exit, the improvement comprising:

a) the plug having successive cross sections spaced apart rearwardly of the nozzle exit, b) those cross sections transitioning from circular or near circular at the exit plane defined at the nozzle exit, to progressively non-circular, rearwardly.

As will be seen, the cross-sections typically define ellipses having progressively relatively decreasing minor axes.

Further, the cross sections typically have upper and lower portions at opposite sides of a median line, said lower portions progressively reducing in width below that line, and the upper portions progressively increasing in width to a maximum locus above the line. As will be seen, the cross sections define a progressively flattened side face of the plug. That side face is typically angled at an angle $\alpha$ from vertical, where $30°<\alpha<60°$.

Another object is to provide a two-exit co-annular nozzle from which the plug protrudes, as will be seen. That nozzle may have a forward exit portion located rearwardly of the forward exit portion, the plug protruding from and rearwardly of the rearward exit portion.

These and other objects and advantages of the invention, as well as the details of an illustrative embodiment, will be more fully understood from the following specification and drawings, in which:

DRAWING DESCRIPTION

FIG. 1 is a perspective view showing a jet engine exit end, and protruding plug;

FIG. 2 is an axial section taken through a plug, and FIGS. 2a - - - 2d depict plug cross sections at illustrated axial locations along plug length;

Figure 4:
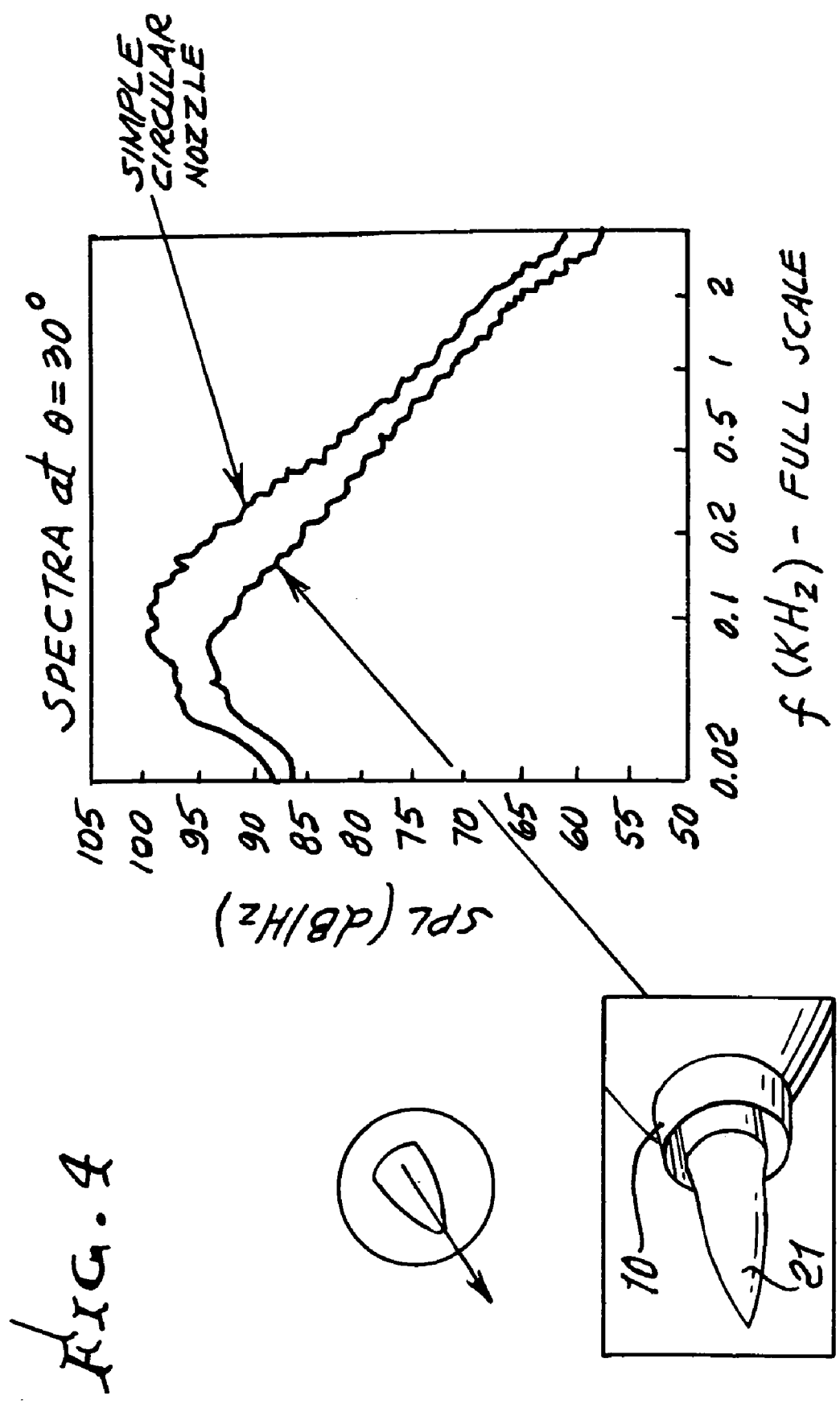
Figure 5:
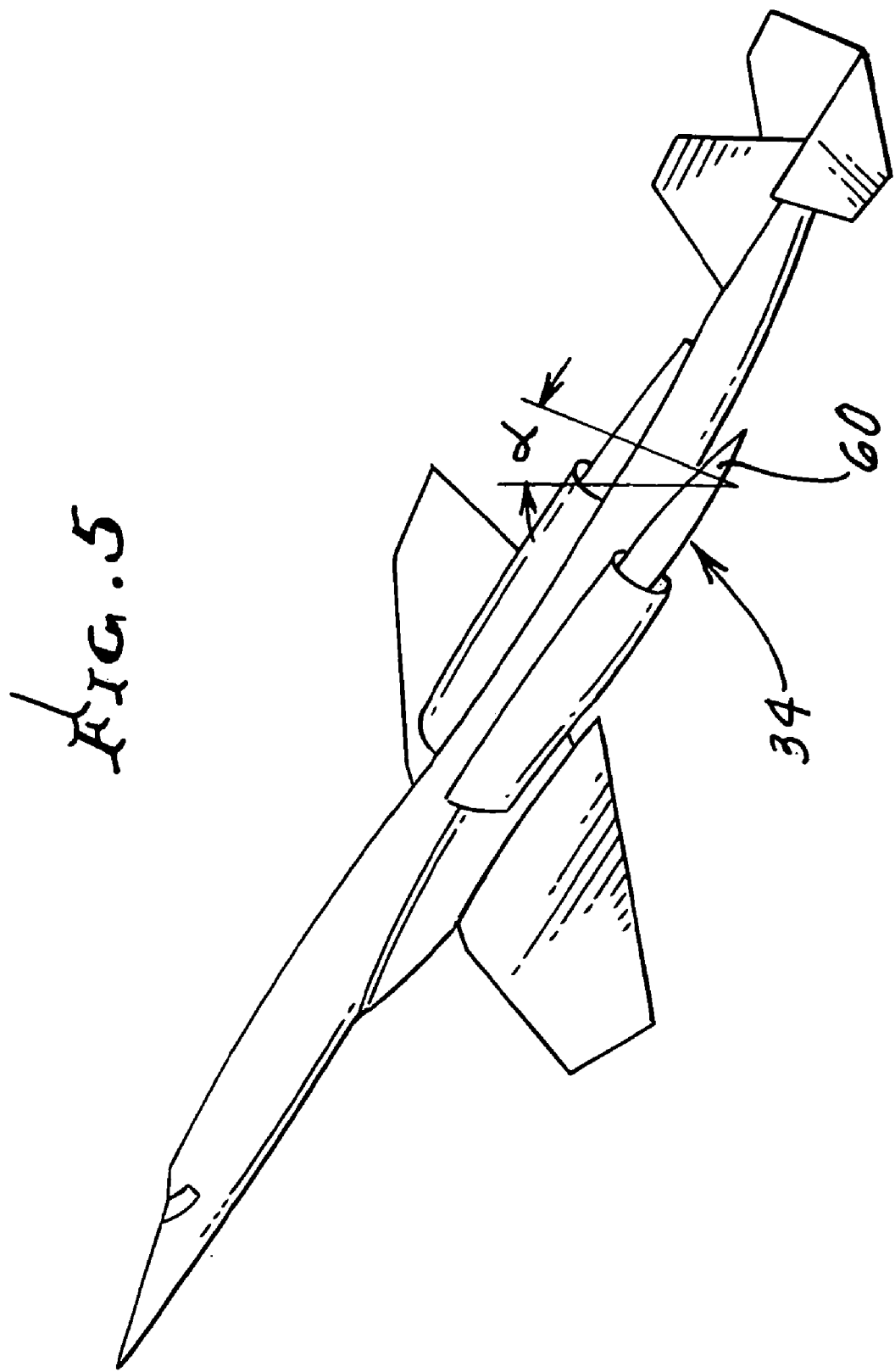
Figure 6:
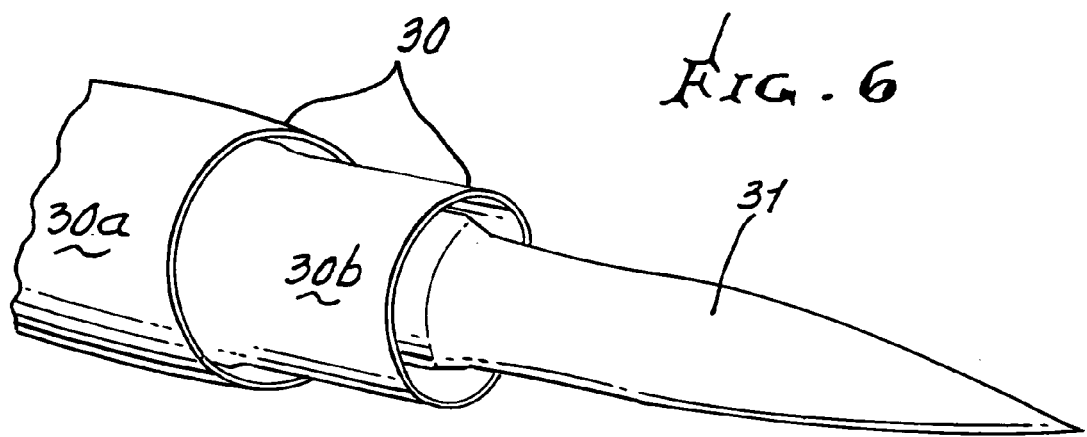
Figure 7:
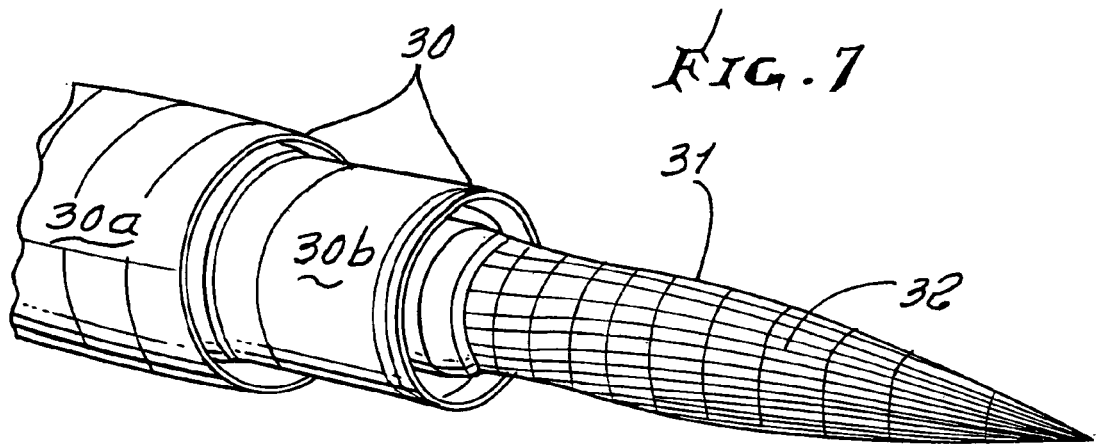

FIG. 3 and FIGS. 3a - - - 3d are views like those of FIG. 2 and FIGS. 2a- - - 2d, showing a modified plug shape;

FIG. 4 is a graph showing noise spectra from a shaped non-circular cross-section plug (lower curve) relative to noise spectra from a circular cross-section plug (upper curve);

FIG. 5 is a perspective view of an aircraft embodying jet engine configurations according to the present invention;

FIGS. 6 and 7 show modified jet engine nacelle and associated plugs.

DETAILED DESCRIPTION

FIG. 1 is referred to above.

FIG. 2 illustrates a plug 11 transitioning from a circular cross-section at plane 15 just downstream of the exit plane 13 to a flattened elliptical cross-section 14, near the plug tip 11a, with such shaping leading to a reduction in noise propagation opposite the major axes 16 of the elliptical sections 18-20 shown. These have increasing ellipticity in the exhaust flow direction 80, the plug length axis indicated at 81.

The plug axis is indicated at 81. In a midsection 11b downstream of plane 15 and extending aft approximately ⅓ to ⅔ of the total distance between plane 15 and the plug end 11a, the major axis 16 is of approximately constant length, not varying by more than 10% within the midsection 11b. Major axis 16 is allowed to reduce in length in section 11c aft of 11b. Cross sections 2a, 2b, 2c and 2d illustrate a continuous reduction in minor axis in sections progressively aft of plane 15, resulting in increasing aft ellipticity in the direction of flow 80. Section 2e is a cross-section through the nozzle in line with the major axis plane 16, showing the combination of nearly constant major axis length and reducing minor axis length progressing aft along midsection 11b that defines a surface of convexity in planes parallel to major axis 16.

In a further and modified embodiment of the invention and as seen in FIG. 3, the plug 21 is shaped with one plane of symmetry about the major axis of the section so as to further tailor the plume shape and noise directivity. By so shaping the cross-section, eccentricity can be maximized in a specific direction, thereby enhancing the directivity characteristic of the acoustic noise. Note cross sections 22-24, wherein the ellipse (elliptical shape of the section) has reduced width, below mid-line or minor axis 25, and progressing rearwardly in the flow direction 80.

Note cross sections 3a, 3b, 3c and 3d wherein the cross section has a maximum width 29 displaced away from the mid-line 25. This displacement of the maximum width increases eccentricity and reduces acoustic noise in the downward direction of the illustration orientation.

The plug illustrated in FIG. 3 has a single plane of symmetry, rather than two planes of symmetry for the elliptical cross-section, however the invention envisions plug shapes of no particular cross-section, but which are specifically tailored to optimize noise directivity patterns. The plug annular surface is also concave at 86 in axial radial planes, fore and aft of the nozzle ring tip 10a.

As shown in FIG. 2, the plug successive cross sections change from circular to progressively non-circular.

FIG. 4 plots acoustic test results for a nozzle of FIG. 3 design, showing noise reduction characteristics (lower curve) relative to noise spectra (upper curve) for a simple circular cross-section nozzle.

On the aircraft the plug shape relative to the fuselage, is typically oriented to minimize the noise propagation in critical directions. For example, aircraft certification testing focuses on three directions, lateral, flyover and approach. Often sideline is the critical direction and typically occurs in a direction approximately 30 degrees below the horizontal and perpendicular to the aircraft takeoff flight path.

A nozzle 34 with plug cross section major axes 16 oriented at 45 degrees to reduce both lateral and flyover noise (directly below the aircraft path) is illustrated in FIG. 5.

FIG. 4b illustrates the orientation of the nozzle to minimize sideline noise with angle 89 (alpha) approximately 60 degrees from the vertical relative to the ground 88 (30 degrees below horizontal).

FIG. 5 illustrates a perspective view of an aircraft 40 incorporating the invention comprising a fuselage 41, wing 42, tail planes 43, 44, outer nozzles 10 and shaped plugs 11. The view illustrates the orientation of the left hand plug 11's flattened side approximately normal to the view and the narrow concave shape of the right hand side due to their orientation rotated along their respective longitudinal axis such that the cross sectional eccentricity is aligned towards the sideline microphone.

In summary, the plug has successive cross sections spaced apart rearwardly of the nozzle exit, and the cross sections transition from circular or near circular at the exit plane defined at the nozzle exit, to progressively non-circular. In this regard, the cross sections typically define ellipses having progressively relatively decreasing minor axes; and the cross sections may typically have eccentricity (non-circularity) that progressively increases in said rearward direction. In another embodiment, the cross sections have upper and lower portions at opposite sides of a median line which is nominally perpendicular to the major axis, with lower portions progressively reducing in width below that line, and said upper portions progressively increasing in width to a maximum locus 29 above the line. Also, the upper portions may progressively decrease in width above said locus. See FIG. 3.

A feature is for the use of such a shaped plug surface on the aft exit of a two exit co-annular nozzle such as for use in high bypass ratio turbofan aircraft. In those applications the most forward nozzle exit is typically the fan bypass flow from an un-mixed turbofan exhaust and the second aft nozzle exit is for the high temperature core flow. The dual tandem nozzle also has noise reduction benefits for mixed flows as well, and the invention is foreseen for applications to both mixed and unmixed turbofan exhaust flows.

FIG. 6 shows such a tandem nozzle 30 with aft shaped plug 31 as in FIG. 3 for example. FIG. 7 is similar, but includes wire frame lines to help illustrate the plug surface warped contour 32. The nozzle has a forward exit portion 30a and a rearward exit portion 30b located rearwardly of 30a and the plug 31 protrudes from a rearwardly of 30b. Also, the exit diameter of 30b is less than the exit diameter of 30a. Plug 31 has a progressively flattened side face, 32. Other embodiments would include similar non-circular plug cross-sections along or lengthwise of tandem nozzle 30.

As shown in the drawings, the jet engine has a plug nozzle and a plug extending rearwardly from the nozzle exit, and includes a) said plug having successive cross sections spaced apart rearwardly of the nozzle exit, b) said cross sections transitioning from circular or near circular at the exit plane defined at the nozzle exit, to progressively non-circular, rearwardly, c) each cross section defining a median line minor axis and a major axis bi-secting said minor axis, and longer than said minor axis, d) the minor axes of successive cross-sections in a rearward direction progressively decreasing in length, beyond a mid-portion of the plug length protruding from the nozzle exit, e) said cross-sections proximate ends of said major axes having convexity facing away from said major axes, f) the major axes of successive cross-sections in a rearward direction substantially between the nozzle exit and said plug length mid-portion remaining approximately the same.

Also, reference to cross sections having convexity facing away from a major axis or axes as used herein refers to a convex surface with an apex at the radially distal end of the major axis or axes shown in FIG. 3.

What is claimed is:

1. In a jet engine having a plug nozzle and a plug extending rearwardly from the nozzle exit, the improvement comprising
   a) said plug having successive cross sections spaced apart rearwardly of the nozzle exit,
   b) said cross sections changing from circular or near circular at the exit plane defined at the nozzle exit, to progressively non-circular, rearwardly,
   c) each cross section defining a median line minor axis and a major axis bi-secting said minor axis, and longer than said minor axis,
   d) the minor axes of successive cross-sections in a rearward direction progressively decreasing in length, beyond a mid-portion of the plug length protruding from the nozzle exit,
   e) said cross-sections at ends of said major axes having convex surface outlines directed from and protruding away from said major axes at distal ends thereof,
   f) the major axes of successive cross-sections in a rearward direction substantially between the nozzle exit and said plug length mid-portion remaining substantially the same.

2. The improvement of claim 1 wherein said cross-sections define ellipses having progressively relatively decreasing minor axes.

3. The improvement of claim 1 wherein said cross sections have boundary curvature that progressively increases in said rearward direction.

4. The improvement of claim 1 wherein said cross sections have upper and lower portions, said lower portions progressively reducing in width, and said upper portions progressively increasing in width to a maximum locus.

5. The improvement of claim 4 wherein said upper portions progressively decrease in width above said locus.

6. The improvement of claim 1 wherein the nozzle is a two exit co-annular nozzle, wherein the second aft nozzle is comprised of a shaped plug nozzle.

7. The improvement of claim 6 wherein the plug nozzle has a forward exit portion and a rearward exit portion located rearwardly of the forward exit portion, the plug nozzle protruding from and rearwardly of the rearward exit portion.

8. The improvement of claim 7 wherein the rearward exit portion has an exit diameter less than the exit diameter of the forward exit portion.

* * * * *